United States Patent Office 3,433,242
Patented Mar. 18, 1969

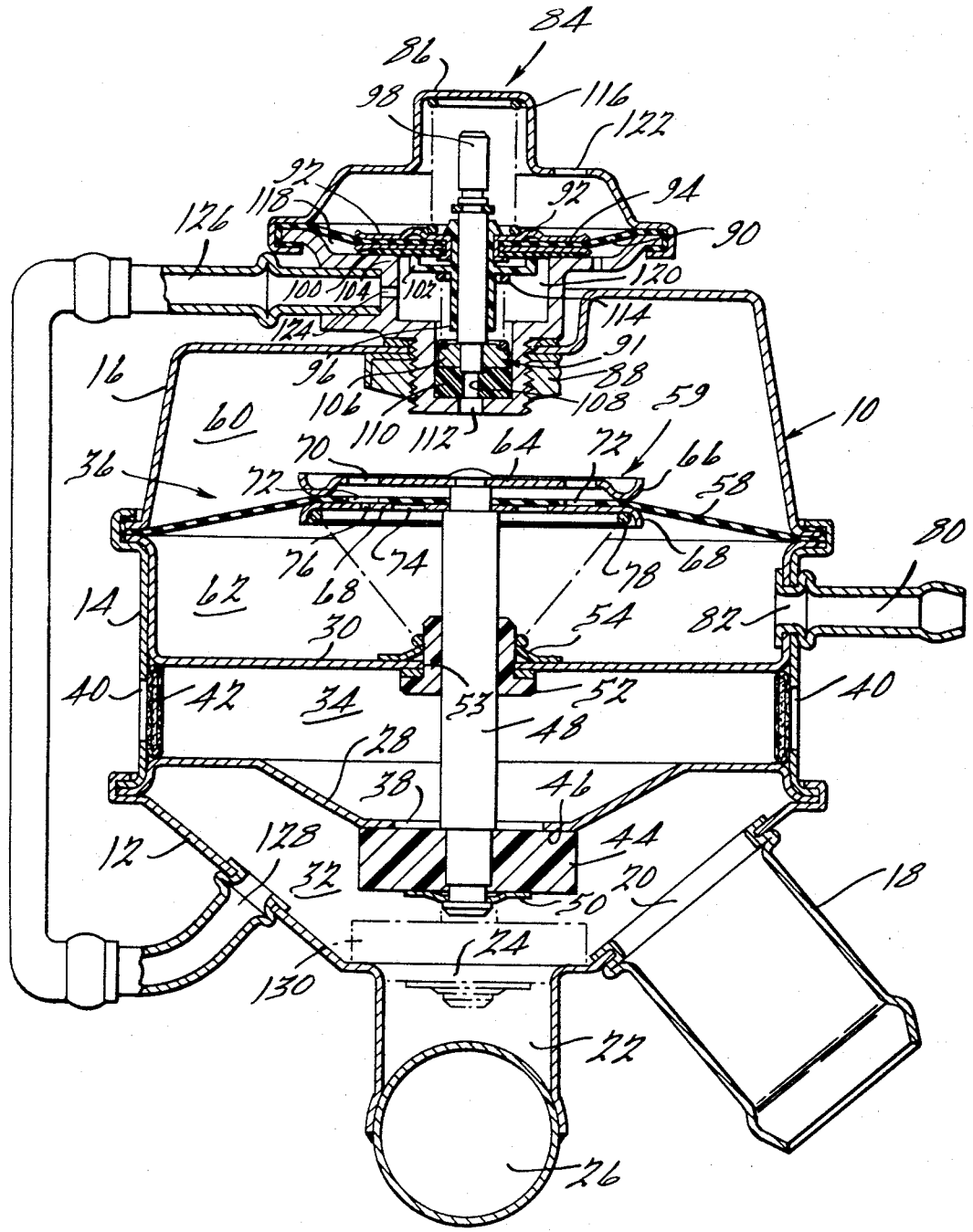

3,433,242
FLUID BYPASS AND PRESSURE RELIEF VALVE ASSEMBLY
Wylie J. Voorheis, Southfield, Mich., assignor to Ford Motor Company, Dearborn, Mich., a corporation of Delaware
Filed July 3, 1967, Ser. No. 650,802
U.S. Cl. 137—119         12 Claims
Int. Cl. G05d *11/03;* F16k *31/12*

ABSTRACT OF THE DISCLOSURE

An integrated air bypass and pressure relief valve assembly for use with an internal combustion engine having a secondary air system for exhaust emission control. During steady state engine operation, a valve normally closes an air bypass port so that all of the air is delivered to the engine exhaust ports, unless an excessive pressure buildup occurs. If this happens, the air acts through a parallel circuit to operate a pressure relief valve that moves the main valve to open a bypass port. The bypass port is also opened by a vacuum controlled diaphragm type motor that is connected to the main valve stem and moves it to when the engine intake manifold vacuum suddenly changes, as during deceleration of the engine, or suddenly acceleration; and, of which the following is a specification.

This invention relates, in general, to a fluid flow control valve assembly. More particularly, it relates to an air bypass valve assembly that automatically supplies additional air to an internal combustion engine exhaust port for chemical combination with unburned hydrocarbons and other desirable elements to reduce these elements to less harmful forms, and also automatically shunts or bypasses this air to the atmosphere during deceleration of the engine or other times when the air pressure is excessive.

Control of exhaust emitted gases is achieved by burning the unburned hydrocarbon and carbon monoxide concentrations in the exhaust ports of the cylinder heads by introducing air under pressure into the exhaust ports near each exhaust valve. The oxygen in the added air, plus the heat of the exhaust gases in each exhaust outlet port, induces combustion during the exhaust stroke of the piston. The burned gases then flow out of the exhaust manifold and into the exhaust system. There are certain times, however, when it is desirable to cut off this supply of additional air, to suppress backfire, for example, during decelerations of the engine. This is necessary because immediately following the closing of the throttle, after a period of acceleration, a rich fuel mixture results due either to the momentary continuation of fuel flow from the engine carburetor, or from the boiling of residual fuel in the manifold due to the sudden reduction of manifold pressure.

The above overly rich mixture does not burn completely during the normal combustion period and, therefore, is discharged through the engine into the exhaust manifold. The air pump that normally supplies the additional air mentioned above injects this air into the exhaust ports, thereby reducing the rich mixture and causing it to become combustible. Upon the next firing of the cylinder, therefore, the flame traveling out of the exhaust port ignites the now combustible mixture, causing an explosion or backfire in the exhaust system.

To prevent the above condition, a backfire-suppressor valve is provided that bypasses this additional air to the atmosphere whenever the intake manifold pressure decreases, thereby momentarily providing a noncombustible mixture in the exhaust manifold, and eliminating backfire.

Air bypass valves of the above type are known. These valves generally either bypass this air to the intake manifold of the engine, for a short period during deceleration, or into the atmosphere. The air pump that supplies this secondary air generally has a pressure relief valve located in the air pump exhaust chamber to relieve the exhaust air flow if the pressure exceeds a preset value. However, with the relief valve built into the housing of a three vane type pump, for example, as is a common construction, it is noisy because the pressure relief valve will flutter during each cycle of operation of the pump due to the three pressure pulsations per pump revolution.

The invention relates to an air bypass valve in which the pressure relief valve is an integral part of the bypass valve assembly.

More particularly, the invention relates to an integrated air bypass and pressure relief valve assembly for the secondary air system of an internal combustion engine of the automotive type.

One of the principal objects of the invention, therefore, is to provide an integrated air bypass valve and pressure relief valve assembly for use with the secondary air system of an internal combustion engine.

It is a further object of the invention to provide a secondary air control assembly consisting of an integrated air bypass and pressure relief valve in which air flow to the engine exhaust ports varies automatically as a function of the changes in intake manifold vacuum of the engine, and independently as a function of the pressure level of the air.

A further object of the invention is to provide an assembly of the type disclosed above in which the pressure relief valve is sensitive to the pressure levels of the fluid acting against the air bypass valve so as to automatically bypass air to the atmosphere when the pressure exceeds a predetermined level.

Other objects, features and advantages of the invention will become apparent upon reference to the succeeding detailed description thereof, and to the drawing illustrating a preferred embodiment thereof; wherein, The figure shows a cross-sectional view of an integrated air bypass and pressure relief valve assembly constructed according to the invention.

The assembly illustrated in FIGURE 1 shows an essentially three-part valve housing 10 having a lower portion 12, an intermediate portion 14, and an upper portion 16. All of the housing portions are clamped together as shown.

Lower housing portion 12 has a fluid or air inlet conduit 18 that is inserted through an opening 20 in the housing, and an air or fluid outlet conduit 22 inserted into an opening 24. Inlet 18 is supplied with air under pressure from an engine driven pump, not shown. Outlet 22 is connected to an air manifold 26 that supplies the air from inlet 18 to the various cylinder exhaust ports in the engine.

Housing 10 contains a number of internal partition members 28 and 30 that divide the housing into essentially three closed air chambers 32, 34 and 36, respectively. Chambers 32 and 34 communicate with each other through a central opening 38 in partition 28. Chamber 34 also is open to the atmosphere or environmental surroundings of the housing 10 through a number of peripheral apertures or openings 40. An annular wire mesh enclosed, paper filter element 42 covers openings 40, for a purpose to be described later.

The flow of air through either outlet 24 or bypass opening 38 is controlled by a reciprocating valve 44 that is alternately seatable against outlet 24 or against bypass opening 38. Partition 28 is suitably shaped to form a valve seat portion 46. Valve 44 is secured to a valve stem 48 by a nut 50, the stem 48 projecting upwardly in a sealing manner through a bushing 52. The bushing projects through an aperture 53 in partition 30, and is secured in place by a suitable push nut 54. The end of valve stem 48 projects into chamber 36, and is operatively fixed to an annular flexible diaphragm member 58 by a valve assembly 59.

Diaphragm member 58 is secured at its outer edge in a sealing manner to housing 10, and divides chamber 36 into upper and lower chamber portions 60 and 62, respectively. The diaphragm is clamped to valve stem 48 between an upper annular metal retainer 64, having beaded end portions 66, and a lower essentially flat annular retainer 68. Upper retainer 64 has a number of holes 70 that cooperate with aligned holes 72 in diaphragm 58 and offset holes 74 in lower retainer member 68. A further orificed flow restricting hole 76 is provided in the lower retainer member. The retaining member and diaphragm apertures cooperate to define a check valve permitting restricted communication between chambers 60 and 62 when the air pressure in chamber 60 is greater than that in chamber 62, and free communication between the chambers when the pressure in chamber 62 is greater than that in chamber 60. This will be explained in more detail later.

A spring 78 is seated between push nut 54 and the outer edge of lower retainer 68, and normally maintains diaphragm 58 and valve stem 48 and valve 44 in the position shown when the pressure levels of the air in opposite chamber portions 60 and 62 are equal.

Chamber 62 is connected at all times with the vacuum in the intake manifold of the internal combustion engine through a conduit 80 insertable through an aperture 82 in housing wall portion 14. Chamber portion 60, on the other hand, is closed and acts for the most part as an essentially quiescent air chamber, for a purpose to be described.

Completing the assembly, housing portion 16 contains a pressure relief valve assembly 84. This latter assembly has upper and lower housing portions 86 and 88 that are clamped together, as shown, and clamp the edge of an annular flexible diaphragm 90. The diaphragm is fixed to a pressure relief valve assembly 91 by upper and lower annular retainers 92 and 94 that sealingly engage a central bushing 96. The bushing has a press fit on a valve stem 98. Lower retainer member 94 abuts an annular sealing gasket 100 that normally seats against a radial extension 102 of bushing 96 and a shoulder 104 on the lower housing portion 88. Valve stem 98, at its lower end, is secured to a pressure relief valve member 106, and continues downwardly with stepped diameter portions through an aperture 108 in a valve seat 110 and an opening 112 in the lower portion of housing portion 88.

A spring 114 between the bushing extension 102 and a chamfered portion valve 106 normally maintains the valve downwardly against seat member 110 to seal flow of fluid through outlet 112. A spring 116, seated between the upper housing 86 and the upper diaphragm retaining member 92 normally biases the diaphragm and valve assembly downwardly to seat against shoulder 104 and bushing arm 102. In this position, gasket 100 divides the area between diaphragm 90 and lower housing portion 88 into two chambers 118 and 120 that effects to the valve a snap action when actuated, in a manner that will be described later.

Upper housing portion 86 is vented to the atmosphere through one or more apertures 122. The lower housing portion 88 communicates with the air or fluid in the lower chamber 32 through a restricted opening 24 and a conduit 126 opening at its lower end 128 into chamber 32.

*Operation*

So long as the engine is operating, the air pump (not shown) will supply air under pressure to conduit 18 and chamber 32. Simultaneously, the intake manifold pressure of the engine will be reflected in chamber 62 through conduit 80. Under steady state operation, such as when the vehicle is cruising, the intake manifold depression in chamber 62 will be communicated to chamber 60 through the restricted port 76 and holes 72 and 70 in upper retaining member 66 and diaphragm member 58, respectively. Thus, chamber portions 60 and 62 will be at the same intake manifold depression level, permitting spring 78 to position the diaphragm and valve 44 as shown to completely block bypass outlet 38. Accordingly, the output of the air pump, during this steady state operation, will pass into the air manifold 26 and be distributed to the various engine cylinder exhaust ports. Simultaneously, however, the air pressure in chamber 32 will act through tube 126 on the pressure relief valve gasket 100 in an attempt to raise the diaphragm 90 against the force of spring 116.

Assume now that the vehicle operator releases the accelerator pedal to obtain a coasting operation of the engine. Immediately, the intake manifold depression increases to a maximum, this being reflected in chamber 62. Since the restricted opening or orifice 76 is the only communication at this time between chambers 62 and 60, the now greater pressure in chamber portion 60 will push the entire diaphragm assembly and, therefore, the valve stem 48 and valve 44 progressively downwardly to the dotted line position 130 and open bypass port 38 while closing the air manifold outlet 24. The output of the air pump will then flow out to the atmosphere through bypass 38 and the housing outlets 40. The paper filter element 42 at this time not only acts to clean the air discharged into the atmosphere, but also as a silencing member to reduce the noise level of the air rushing through outlets 40.

The above action is only temporary, since it is only during the initial stages of deceleration that the high rate of fuel flow into the intake manifold continues momentarily before sufficient time has passed for it to be reduced as a result of the reduced air flow through the carburetor upon reduction in engine speed. The return to normal operation is automatically obtained by the action of the check valve assembly 59. The reduced pressure in chamber portion 62 is slowly communicated to chamber portion 60 through orifice 76 and apertures 72 and 70. Thus, after the initial fast downward movement, the diaphragm will move progressively upwardly to progressively close off the bypass port and open the air manifold outlet 24.

Assume, however, that during the decelerating action, the vehicle operator suddenly depresses the accelerator pedal to demand more fuel flow and power. The pressure in chamber 60 is lower than that in chamber 62, but the pressure in chamber 62 is also lower than it was prior to the decelerating condition, due to the action of bleed 76. Therefore, when the accelerator pedal is suddenly depressed, the high manifold vacuum in chamber 62 suddenly decays to a value less than the vacuum level in chamber 60; that is, the air pressure in chamber 62 now is higher than that in chamber 60. The higher pressure in chamber 62, acting through lower retainer member ports 74 on diaphragm 58 now flexes the diaphragm 58 away from the lower retainer and therefore opens wide communication between the chambers 60 and 62 through the holes 74, 72 and 70. The pressure levels in chambers 60 and 62, therefore, are quickly equalized, and permit spring 78 to quickly return diaphragm 58 and valve 44 upwardly to close the bypass port 38 and open air manifold outlet 24.

The quantity of air flow to the air manifold and exhaust ports will, of course, increase in proportion to engine speed. Therefore, at high engine speeds, a considerable amount of additional air is being supplied to each of the engine exhaust ports. The chemical combination of this air with the unburned hydrocarbons and the subsequent combustion thereof in the exhaust system creates high temperatures of the materials of the exhaust system. This, therefore, requires the use of high temperature resistance materials, which are expensive. The action of the pressure relief valve assembly 84, however, acts at the higher engine speeds and higher air pressure levels to automatically bypass the air to prevent combustion at these speed levels and, therefore, render the use of high temperature resistant materials unnecessary.

More specifically, at some predetermined air pressure level, the air pressure from chamber 32 acting through conduit 126 on relief valve chamber gasket 100 will be sufficient to overcome the force of spring 116 and move the gasket off its seat on the lower housing portion 88 and bushing arm 102. The moment that the gasket opens communication between chamber portions 118 and 120, the air pressure now can act against a considerably larger effective area of the lower diaphragm portion and thereby immediately pop the diaphragm upwardly to its upper limit against the upper housing portion 86. This quickly moves the relief valve 106 upwardly and opens communication between the bypass valve portion 60 and the air pressure in conduit 126.

The sudden high pressure in chamber portion 60 as compared to the lower pressure in chamber 62 now quickly moves diaphragm 58 and valve 44 downwardly to open bypass port 38 and close air manifold outlet 24. Thus, at high engine speeds, the air from air pump conduit 18 passes out to the atmosphere through housing apertures 40.

From the foregoing, therefore, it will be seen that the invention permits a shutoff of the air to the exhaust system at say, above legal speeds, so that the vehicle exhaust system is not subjected to excessive temperatures. Also, the inclusion of the pressure relief valve as an integral part of the bypass valve assembly permits the removal of the relief valve from the air pump, which is an advantage noise-wise because of the elimination of the fluttering of the relief valve on its seat.

While the invention has been illustrated in its preferred embodiment in the drawing, it will be clear to those skilled in the arts to which it pertains that many changes and modifications may be made thereto without departing from the scope of the invention.

I claim:
1. A fluid distributor valve assembly comprising, in combination, a valve housing having a fluid inlet containing fluid varying in pressure, a fluid outlet, passage means interconnecting said inlet and outlet and having a fluid vent port therein, reciprocable valve means associated with said passage means and movable alternately between positions blocking said port and opening said outlet and vice-versa, and control means for moving said valve means to said positions including: a vacuum controlled motor means operably secured to said valve means and connected to a source of varying intensity vacuum and having spring means biasing said valve means in a port closing direction, said valve means being movable by said motor means in a port opening direction upon the attainment of a predetermined vacuum level of said source, said valve means also being movable in a port opening direction upon the attainment of a predetermined pressure level of the fluid in said inlet operably acting on said valve means.

2. A valve assembly as in claim 1, including second passage means operably connecting the fluid in said inlet to said vacuum motor to act thereon in a port opening direction.

3. A valve assembly as in claim 2, including pressure relief valve means in said second passage means normally blocking the flow of inlet fluid through said second passage means and movable in response to the attainment of a predetermined inlet fluid pressure acting thereon to a position opening said second passage means.

4. A valve assembly as in claim 1, said inlet fluid pressure acting directly on said valve means in a port closing direction when said valve means is in a port closed position, and in a port opening direction when said valve means is in a fluid outlet closed position.

5. A valve assembly as in claim 1, said valve means having a single land thereon with opposite face portions thereof constituting port closing and fluid outlet closing members, respectively.

6. A fluid distributor valve assembly comprising, in combination, a valve housing having a fluid inlet containing fluid varying in pressure, a fluid outlet, passage means interconnecting said inlet and outlet and having a fluid vent port therein, reciprocable valve means associated with said passage means and movable alternately between positions blocking said port and opening said outlet and vice versa, and control means for moving said valve means to said positions including: a vacuum controlled motor means operably secured to said valve means and connected to a source of varying intensity vacuum and having spring means biasing said valve means in a port closing direction, said valve means being movable by said motor means in a port opening direction upon the attainment of a predetermined vacuum level of said source, said control means also including further means connecting said inlet fluid under pressure to a portion of said motor means for moving said motor means and said valve means in a port opening direction upon the attainment of a predetermined pressure level of the fluid in said inlet.

7. A valve assembly as in claim 6, said further means including a fluid line connected at one end to said passage means and at its opposite end to said portion of said motor, and pressure relief valve means in said line normally closing said line and movable progressively to a position opening said line in response to a predetermined pressure of the fluid in said line operably acting on said pressure relief valve means.

8. A valve assembly as in claim 7, said relief valve means including a fluid pressure chamber having a diaphragm spring biased to one position and partitioning said chamber into two noncommunicating portions, means connecting one chamber portion to the atmosphere, means connecting the other chamber portion to the fluid pressure in said line and to said motor portion, and a valve connected to and movable by said diaphragm into and out of said latter means to block or permit flow from said line to said motor portion.

9. A fluid distributor valve assembly comprising in combination, a housing having first and second chambers, said first chamber having a fluid inlet containing fluid varying in pressure and first and second fluid outlets, said second outlet being a fluid inlet to said second chamber, a valve in said first chamber reciprocably seatable against said outlets for alternately closing one outlet while opening the other, an opening in said housing into said second chamber permitting flow of fluid through said second outlet when open to the outside of said housing, said third chamber having a movable flexible diaphragm therein partitioning said third chamber into two variable volume portions, and being fixedly secured to said stem for reciprocation thereof, said diaphragm having flow restricting apertures therein providing controlled communication of fluid between said portions, spring means biasing said diaphragm and valve stem in a second outlet closing position, a source of vacuum varying in intensity connected to one of said chamber portions for movement of said diaphragm as a function of the changes in vacuum level, and means at times connecting the fluid under pressure in said first chamber to said third chamber other portion for movement of said diaphragm and valve to a second outlet opening position.

10. A valve assembly as in claim 9, said latter means including a fluid conduit connecting said first chamber and third chamber other portion.

11. A valve assembly as in claim 10, including a pressure relief valve in said conduit spring biased to a position blocking flow of fluid to said other portion and movable by a predetermined pressure of the fluid in said first chamber operably acting thereon to a second position permitting flow of said latter fluid to said third chamber other portion.

12. A valve assembly as in claim 11, including a fluid motor connected to said relief valve, and operable by the pressure of the fluid in said conduit acting on said motor to move said relief valve.

References Cited

UNITED STATES PATENTS

| Re. 12,813 | 6/1908 | Krichbaum | 137—489.5 |
| 3,035,596 | 5/1962 | Guinard | 137—119 XR |

HAROLD W. WEAKLEY, *Primary Examiner.*

U.S. Cl. X.R.

137—489.5, 495